Jan. 29, 1929.  1,700,163
G. P. HEIKES
APPARATUS FOR STRINGING SEED CORN
Filed May 2, 1928
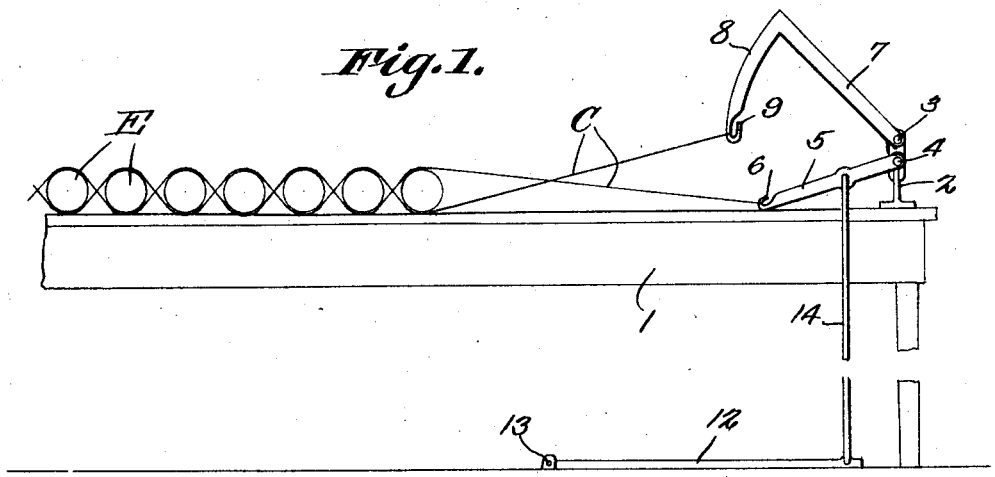
Fig. 1.
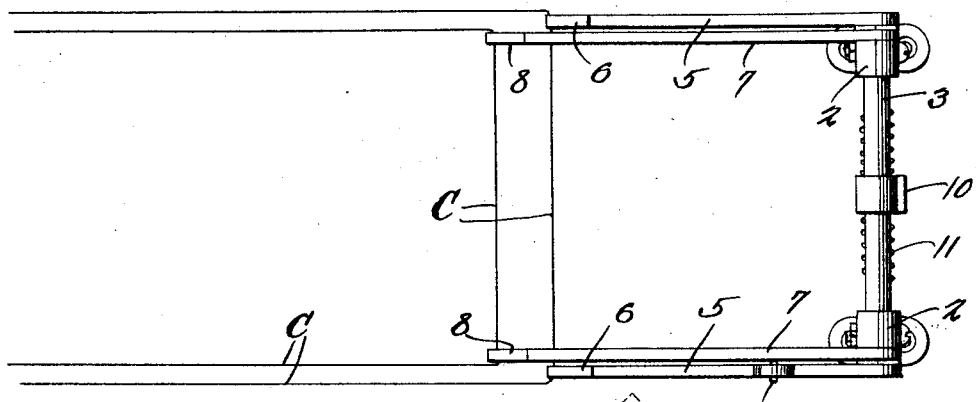
Fig. 2.
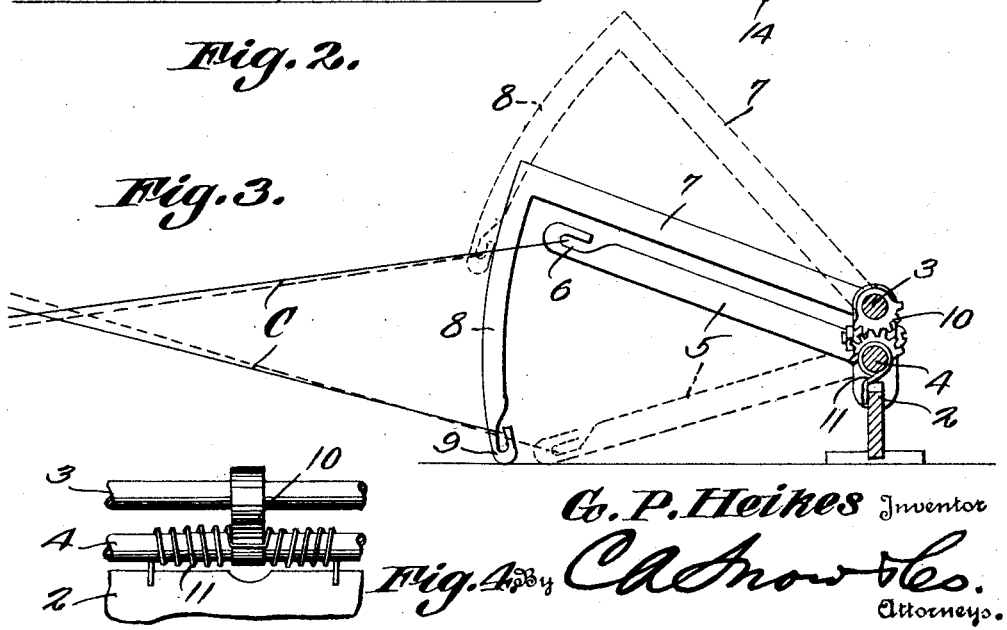
Fig. 3.
Fig. 4.
G. P. Heikes, Inventor
Attorneys.

Patented Jan. 29, 1929.

1,700,163

UNITED STATES PATENT OFFICE.

GEORGE P. HEIKES, OF WATSEKA, ILLINOIS.

APPARATUS FOR STRINGING SEED CORN.

Application filed May 2, 1928. Serial No. 274,570.

This invention relates to apparatus for stringing seed corn, one of the objects being to provide simple and efficient means adapted to be operated by a foot treadle whereby ears of seed corn can be secured between cords which are shifted relative to each other so as to receive the ears between them and hold them properly assembled for hanging and drying.

A further object is to provide apparatus of this character which is simple, compact and efficient and from which the series of connected ears can be removed readily after the completion of the tying operation.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the apparatus showing the same in use.

Figure 2 is a top plan view thereof.

Figure 3 is an enlarged side elevation showing the needles shifted from the position shown in Figure 1 to their other extreme position.

Figure 4 is an elevation of a portion of the operating mechanism of the needle.

Referring to the figures by characters of reference 1 designates a table or other structure provided with bearing members 2 at one end in which are journaled upper and lower shafts 3 and 4 respectively. Secured to and extending radially from the end portions of the shaft 4 are needles 5 provided at their free ends with hooks 6. Arms 7 are extended from the shaft 3 adjacent the ends thereof and at the free ends of these arms are located downwardly extending arcuate needles 8 having hooks 9 at their lower ends. Needles 8 are adapted to work adjacent to the ends of the needles 5. Segmental gears 10 are secured to the respective shafts 3 and 4 and are constantly in mesh, there being a spring 11 mounted on shaft 4 exerting a constant thrust against the gear thereon so as to hold the needles 5 normally raised and the needles 8 normally lowered as shown by full lines in Figure 3.

A treadle 12 is pivotally mounted at one end, as shown at 13 while its other end is connected by a rod 14 to the needles 5.

As before stated the needles are normally positioned as shown in Figure 3 at which time the treadle 12 is of course elevated from the position illustrated in Figure 1. A cord C is tied together at its ends and is placed in the hooks 8 of the two needles 7. This cord is then formed into an elongated loop and the remote end of the loop is placed in the hooks 6 of the needles 5. An ear of corn E is then placed between the folds of the loop at one end after which the treadle 12 is depressed. This will cause the opposed portions of the looped cord to be swung from the position shown in Figure 3 to the position shown in Figure 1. Thereafter another ear of corn is placed between the opposed portions of the cord and when the treadle is released the needles will carry the ends of the looped cord to the opposite extreme positions. A third ear of corn is then placed between the opposed portions of the cord loop and the foregoing operation is repeated. After successive operations the series of ears of corn will be held between the crossed portions of the cord as shown in Figure 1 and after the desired number of ears have thus been placed together the ends of the looped cord are removed from the hooks 6 and 9 and fastened together, thereby completing an elongated band made up of ears of corn held together by the crossed cords. The ears thus assembled can be suspended for drying. The spring 11 of course serves to hold the needles yieldingly in their normal positions and also serves to yieldingly support the treadle 12 although it is to be understood that, if preferred, a separate spring can be used for holding the treadle elevated normally.

What is claimed is:

1. The combination with a supporting structure, and superposed shafts journaled thereon, of needles extending from and movable with one of the shafts, arms extending from and movable with the other shaft, needles extending from the arms at angles thereto, means on all of the needles for engaging a cord, an operative connection between the shafts for positively rotating them in opposite directions respectively, and means for actuating the shafts to oscillate the needles simultaneously in opposite directions respectively.

2. In apparatus of the class described superposed shafts, gears thereon for rotating the shafts simultaneously in opposite directions respectively, arms extending from one of the shafts, needles extending at angles from said arm, needles extending from the other shaft, means on the needles for engaging a cord, a spring for holding the needles normally in predetermined positions relative to each other, and means under the control of an operator for simultaneously actuating the needles in opposite directions respectively.

In testimony that I claim the foregoing as my own, I have hereto affixed my signature.

GEORGE P. HEIKES.